(No Model.)

A. H. EDGREN & G. ELMEN.
ATTACHMENT FOR BICYCLES.

No. 561,545. Patented June 2, 1896.

WITNESSES
Geo. M. Anderson
Phil. C. Masi.

INVENTORS
A. H. Edgren
George Elmen
by E. W. Anderson
their Attorney

UNITED STATES PATENT OFFICE.

AUGUST HJALMAR EDGREN AND GEORGE ELMEN, OF LINCOLN, NEBRASKA; SAID EDGREN ASSIGNOR TO SAID ELMEN.

ATTACHMENT FOR BICYCLES.

SPECIFICATION forming part of Letters Patent No. 561,545, dated June 2, 1896.

Application filed August 2, 1895. Serial No. 557,996. (No model.)

*To all whom it may concern:*

Be it known that we, AUGUST HJALMAR EDGREN and GEORGE ELMEN, citizens of the United States, and residents of Lincoln, in the county of Lancaster and State of Nebraska, have invented certain new and useful Improvements in Attachments for Bicycles; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
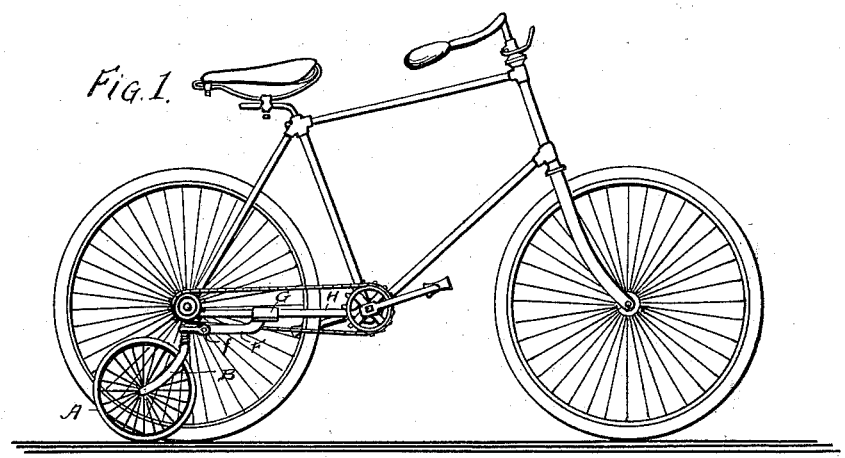
Figure 2:
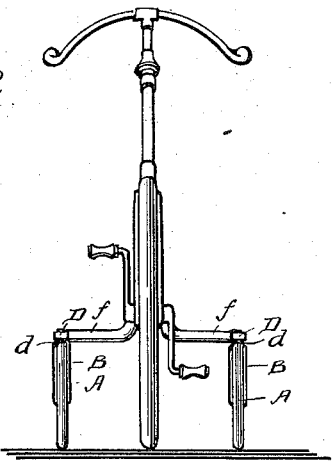
Figure 3:
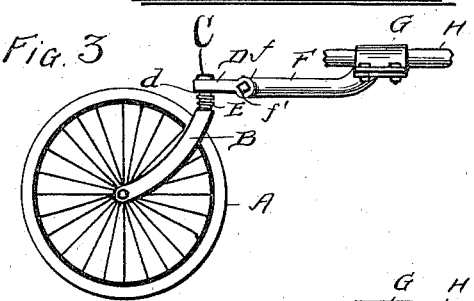
Figure 4:
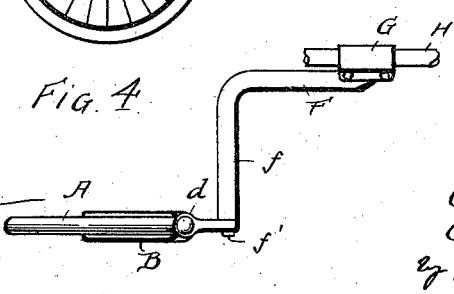

Figure 1 of the drawings is a representation of a side view of a bicycle with the invention applied thereto. Fig. 2 is a front view of same. Fig. 3 is an enlarged side elevation of the invention, bar H broken. Fig. 4 is a plan view of same.

This invention has relation to attachments for bicycles, and is designed to provide means of simple character which can be readily applied to any ordinary bicycle for temporary use for the purpose of supporting entirely or in part, as may be desired, the bicycle while the beginner practices the use of the pedal and handle-bars and mounting and dismounting.

With this object in view the invention consists in the novel construction and combination of parts, all as hereinafter described, and pointed out in the appended claim.

The attachment consists more particularly in a wheel A, which is of relatively small diameter in comparison to the wheels of the bicycle, and in a support therefor, which is designed to be detachably secured to the frame of the bicycle in such position that the said wheel A will travel at one side of the machine to form a lateral guard against its falling. One of these attachments is usually provided upon each side of the machine.

The wheel A is journaled and turns in an oblique fork B, having at its upper end portion a headed journal C, which turns in a bearing *d* of a horizontal arm D. Seated upon the lower shoulder of this journal and against the under side of arm D is a wire spring E, which takes up the vertical vibrations of the wheel. The arm D is attached to the laterally-projecting arm *f* of an angular bracket F by means of a screw *f'*. By loosening the screw the arm D can be adjusted to raise or lower the wheel. The inner arm of the bracket F is detachably connected to a suitable coupling by G, which is attached to a bar H of the bicycle-frame. This bar may be either the side or the diagonal bar of the frame.

In case it is desired the attachments shall only partially support the machine the wheels A are raised to a greater or less distance above the ground. In this position they are inactive so long as the machine is kept vertical, but should the learner lose control of the machine they will prevent a fall.

Having thus described our invention, what we claim as new, and desire to secure by Letters Patent, is—

In an attachment for bicycles for the purpose described, the combination with a bracket having means whereby it may be connected to a bicycle-frame, and having a laterally-projecting arm, of the short, horizontal, rearwardly-extending arm D, connected to said lateral arm by a screw-pivot, whereby it may be pivotally adjusted in a vertical plane, a fork having its head journaled in said arm D, and a spring interposed between said arm and a shoulder of the fork-head, substantially as specified.

In testimony whereof we affix our signatures in presence of two witnesses.

A. HJALMAR EDGREN.
   GEORGE ELMEN.

Witnesses:
 STEPHEN P. O'HERN,
 J. L. MACK.